Figure 1:
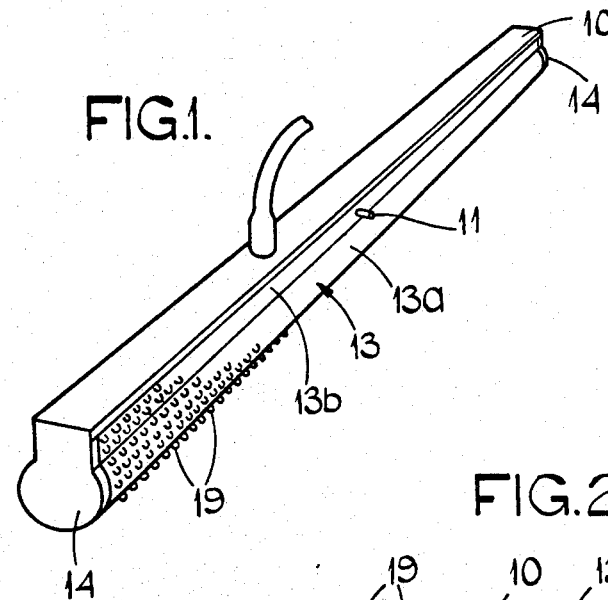

United States Patent [19]

Timmis et al.

[11] 4,208,758
[45] Jun. 24, 1980

[54] VEHICLE LAMP WIPER

[75] Inventors: John P. Timmis; Anthony Johnson, both of Sutton Coldfield, England

[73] Assignee: Lucas Industries Limited, Birmingham, England

[21] Appl. No.: 940,612

[22] Filed: Sep. 8, 1978

[30] Foreign Application Priority Data

Sep. 20, 1977 [GB] United Kingdom ............... 39163/77

[51] Int. Cl.² .......................... B60S 1/46; B60S 1/02
[52] U.S. Cl. ........................ 15/250.04; 15/250 A
[58] Field of Search ............... 15/250.01–250.04, 15/250.36, 250 A, 104.94, 231

[56] References Cited

U.S. PATENT DOCUMENTS

| | | | |
|---|---|---|---|
| 2,648,865 | 8/1953 | Gordon et al. | 15/250.04 |
| 3,298,507 | 1/1967 | Micciche | 15/104.94 X |
| 3,431,577 | 3/1969 | Minsky | 15/250.04 |
| 3,849,827 | 11/1974 | Coropolis et al. | 15/250.04 |
| 3,871,049 | 3/1975 | Workman | 15/250.04 |
| 3,924,290 | 12/1975 | Puyplat | 15/250 A |
| 4,060,872 | 12/1977 | Bucklitzsch | 15/250.04 |
| 4,123,817 | 11/1978 | Hartery | 15/250.04 |

FOREIGN PATENT DOCUMENTS

| | | | |
|---|---|---|---|
| 1544875 | 9/1968 | France | 15/250.04 |
| 2221931 | 10/1974 | France | 15/250 A |
| 332759 | 11/1958 | Switzerland | 15/231 |

Primary Examiner—Edward J. McCarthy

[57] ABSTRACT

A vehicle headlamp wiper includes a relatively rigid support and a flexible wall joined to the support so as to define a chamber. A liquid inlet to the chamber is provided in the support. Outlets are provided through a surface of the flexible wall which is opposite the headlamp lens. A multiplicity of scrubbing or scouring elements, e.g. loops of plastics or abrasive particles, are anchored to the flexible wall and engage the headlamp lens. When liquid fills the chamber, the wiper can conform to curvature of the headlamp lens by deformation of the flexible wall and even caked-on dirt on the lens can be removed because of the provision of the scrubbing or scouring elements.

8 Claims, 5 Drawing Figures

U.S. Patent

Jun. 24, 1980

4,208,758

VEHICLE LAMP WIPER

This invention relates to a vehicle lamp wiper and also to a vehicle lamp wiper assembly.

It is known to wipe headlamps by means of a headlamp wiper which is similar to that which is used for wiping vehicle windscreens. In such a wiper, a rubber or like flexible blade is carried by a less flexible support which is attached, in use, to an arm which is linearly or arcuately reciprocatable across a lens of the vehicle lamp. Such a construction has the advantage that sufficient resilience can be built into the wiper to permit the blade to follow a curved lens provided that it is not unduly curved. However, a rubber blade is not particularly efficient at removing dirt which has caked on to the lamp lens. It will be appreciated that lamp lenses are very prone to caking because they are set relatively low on the vehicle and, in use, heat emanating from the lamp filament tends to dry dirt on the lens. The poor efficiency of a rubber blade at removing dirt from a lamp lens arises because there is a tendency for the blade to "strop" in action and to ride over the dirt on the lens. Another disadvantage of such a blade construction, is that the material of construction of the blade, i.e. rubber or a rubber-like material, has a high co-efficient of friction with the result that a relatively large motor is needed to drive the blade.

Another type of known wiper for wiping a vehicle lamp is one which employs a brush. In such a construction, the bristles contact the lamp lens to clean same. Whilst such an arrangement has the advantage that the bristles have a low co-efficient of friction compared with a rubber blade, they have the disadvantage that, if the bristles are made soft and long enough to conform to the shape of the lens to be cleaned, their action to remove caked on dirt is impaired because the bristles tend to collapse under pressure, particularly when they are wet. The use of short and stiff bristles carried in a relatively rigid support is unsatisfactory as it is difficult for such a wiper to clean the whole of the lens effectively in the case when the curvature of the lens changes in the path of movement of the wiper. Furthermore, the situation is worsened in the case where the lamp lens concerned is a headlamp lens connected with a system for tilting the headlamps in accordance with the changes in the attitude of the vehicle body relative to the wheels.

It is an object of the present invention to obviate or mitigate the above disadvantages.

According to one aspect of the present invention, there is provided a motor vehicle lamp wiper comprising a body including a relatively rigid support, a chamber in the body, a flexible wall to the chamber, at least one inlet and at least one outlet to the chamber, and a multiplicity of scouring or scrubbing elements anchored to the flexible wall and serving, in use, to engage against a lens of the vehicle lamp to be cleaned.

In use, a cleaning liquid, for example water, or an aqueous medium including cleaning and/or anti-freeze additives is passed under pressure into the chamber and the pressure of the liquid within the chamber serves to urge the flexible wall outwardly and so urge the scouring elements into contact with the surface of the lens. Because of the flexible nature of the wall, the scouring elements can relatively easily follow the changes in contour of the lamp lens.

It will be appreciated that the nature, disposition and size of the scouring elements, the flexibility and size of the wall, and the working pressure within the chamber in use will be selected according to the size and curvature of the lamp lens to be cleaned.

In a preferred embodiment, said at least one outlet is provided in a portion of the flexible wall which directly faces the lamp lens in use. Most advantageously, said at least one outlet comprises a plurality of outlet apertures which are spaced apart longitudinally of the wiper.

In a convenient embodiment, the flexible wall is part-cylindrical in shape and the chamber is defined in part by the support. Preferably, said at least one inlet is provided in the support.

The scouring or scrubbing elements or may take the form of short loops of plastic, which are sufficiently rigid to have a scouring or scrubbing action, or may take the form of abrasive or other scouring or scrubbing particles bonded to at least part of the flexible wall. The scouring elements and wall may be integrally formed, e.g. by being moulded together, out of a plastics or rubber material.

According to another aspect of the present invention there is provided a vehicle lamp wiper assembly including at least one wiper in accordance with the present invention mounted on a movable arm, means for moving said arm, and means for supplying liquid to said inlet.

Figure 2:
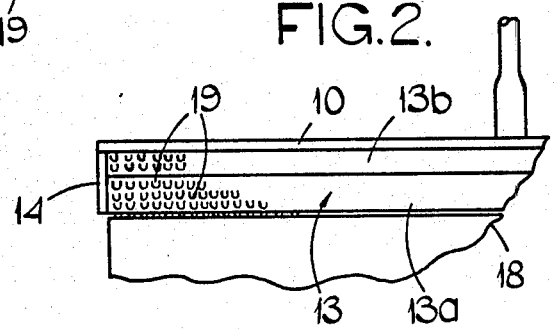
Figure 3:
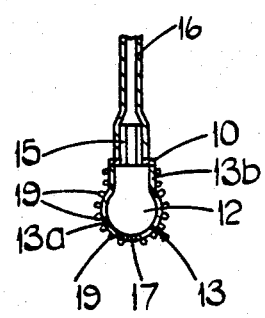
Figure 4:
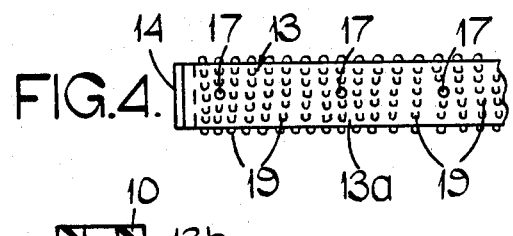
Figure 5:
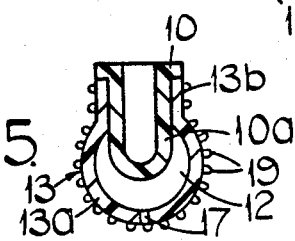

Embodiments of the present invention will now be described, by way of example, with reference to the accompanying drawing in which:

FIG. 1 is a perspective view of one embodiment of a motor vehicle headlamp wiper according to the present invention, FIG. 2, is a side elevation of part of the wiper of FIG. 1, FIG. 3 is a cross-sectional view of the wiper of FIG. 1, FIG. 4 is a view of the underside of part of the wiper of FIG. 1, and FIG. 5 is a cross-sectional view through a modification of the wiper of FIGS. 1-4.

Referring now to FIGS. 1-4 of the drawings, the motor vehicle headlamp wiper comprises a body including a relatively rigid support 10 carrying a lug 11 by means of which the wiper can be detachably secured to a linearly or angularly reciprocatable arm (not shown). The body further includes a chamber 12 defined by the support 10, a flexible wall 13, and end caps 14. The flexible wall 13 consists of a wall portion 13a of part circular cross-section and a pair of mutually parallel wall portions 13b extending outwardly from the wall portion 13a. Each wall portion 13b is secured by means of an adhesive, welding or the like to the support 10 which is in the form of a rectangular strip. In an alternative construction the wall portions 13b are interal with the support 10. The end caps 14 are of the same cross-section at shape as that of the flexible wall 13 and are secured by adhesive or welding thereto. The chamber 12 thus extends throughout the length of the wiper and is provided with an inlet union 15 projecting through the support 10. The union 15 receives a flexible water supply tube 16. The chamber 12 is also provided with a plurality of outlet orifices 17. The outlet orifices 17 are provided in the wall portion 13a remote from the support 10, i.e., in a position in which they are destined to lie opposite a lamp lens 18 (see FIG. 2), to be cleaned. The outlet orifices 17 are spaced apart longitudinally throughout the whole length of the wiper and have a combined cross-sectional area which is less than the effective cross-sectional area of the inlet union 15. Provided over the whole of the external surface of the flexible wall 13 are a multiplicity of spaced short stiff loops 19 of plastics material. In one convenient embodiment, the flexible wall 13 and loops 19 are provided by a material sold under the trade mark VELCRO. The loops 19 are sufficiently short and stiff to act as scouring elements.

In use, the wiper is mounted on a reciprocatable arm through the intermediary of the lug 11 and a length of the wiper is chosen such that the end caps 14 project beyond the lens 18 to be cleaned. In the usual manner with wipers the arm carrying the wiper biases the wiper against the lens 18. When it is desired to clean the lens 18, a wiper motor (not shown) is energised to reciprocate the arm. At the same time, water or other cleaning liquid is passed along tube 16 so as to pressurise the chamber 12. This causes the flexible wall 13 to be flexed outwardly and because of the flexibility of the wall, it can adopt the profile of the lens 18 being washed. It will be appreciated that many vehicle headlamp lenses are curved and the flexibility of the wall 13 allows it to deform to the particular profile of the portion of the lens which is being cleaned at any instant during reciprocation of the wiper. During this reciprocation, the water or other cleaning liquid is ejected from the outlets 17 and serves to assist in loosening of any dirt caked onto the lens 18. The loops 19 contact the surface of the lens 18 and perform a scouring action on the lens 18 which provides for effective removal of the caked on dirt.

In the modification shown in FIG. 5, the support 10 is provided with an integral projecting portion of substantially U-shaped cross-section which serves to reduce the volume of the chamber 12 whereby less water or other cleaning liquid is required to fill the chamber 12 before the required pressurisation can be obtained to enable effective cleaning.

In the place of end caps 14, the ends of the flexible wall may be closed by flattening said ends and glueing or welding (e.g. ultrasonically) the flattening ends at the same time as the wall is secured to the support.

In the place of the loops 19 of plastics material, it is to be appreciated that any other type of scouring or scrubbing elements may be provided on the flexible wall, for example, mildly abrasive particles or even short suitably stiff bristles.

We claim:

1. A motor vehicle lamp wiper comprising a body including a rigid support, means for connecting the relatively rigid support to a drive member which, in use, effects movement of the wiper, a chamber in the body, a flexible wall to the chamber, said flexible wall having a pair of spaced mutually parallel planar wall portions and an arcuate section which is partly circular in transverse cross-section, said arcuate section having a diameter greater than the separation between said planar wall portions, at least one inlet and at least one outlet to the chamber, and a multiplicity of scouring or scrubbing elements anchored to the flexible wall to cover essentially all of the external surface of said flexible wall, said elements serving, in use, to engage against a lens of the vehicle lamp to be cleaned, the arrangement being such that, in use, when the chamber is filled with liquid, the flexible wall adopts the profile of the lens during movement of the wiper.

2. A wiper as claimed in claim 1, wherein said at least one outlet is provided in a portion of the flexible wall which directly faces the lamp lens in use.

3. A wiper as claimed in claim 1 or 2, wherein said at least one outlet comprises a plurality of outlet apertures which are spaced apart longitudinally of the wiper.

4. A wiper as claimed in claim 1, wherein the chamber is defined in part by the support.

5. A wiper as claimed in claim 1, wherein said at least one inlet is provided in the support.

6. A wiper as claimed in claim 1, wherein the scouring or scrubbing elements take the form of loops of plastic, which are sufficiently rigid to have a scouring or scrubbing action.

7. A wiper as claimed in claim 1, wherein the scouring or scrubbing elements take the form of abrasive or other scouring or scrubbing particles bonded to at least part of the flexible wall.

8. A wiper as claimed in claim 1, wherein the scouring or scrubbing elements are integral with the wall.

* * * * *